United States Patent [19]

Ohta

[11] Patent Number: 4,951,126
[45] Date of Patent: Aug. 21, 1990

[54] VIDEO SIGNAL PROCESSING METHOD AND APPARATUS THEREFOR FOR CREATING A PICTURE-IN-PICTURE

[75] Inventor: Ichirou Ohta, Osaka, Japan

[73] Assignee: Sanyo Electric Co., Ltd., Osaka, Japan

[21] Appl. No.: 7,982

[22] Filed: Jan. 28, 1987

[30] Foreign Application Priority Data

Feb. 10, 1986 [JP] Japan .................................. 61-27667

[51] Int. Cl.$^5$ .............................................. H04N 9/64
[52] U.S. Cl. ......................................... 358/22; 358/40
[58] Field of Search ................. 358/183, 181, 22, 180, 358/40

[56] References Cited

U.S. PATENT DOCUMENTS

| 4,063,280 | 12/1977 | Hattori | 358/22 |
|---|---|---|---|
| 4,134,128 | 1/1979 | Hurst | 358/22 |
| 4,139,860 | 2/1979 | Micic | 358/183 |
| 4,249,211 | 2/1981 | Baba | 358/180 |
| 4,651,208 | 3/1987 | Rhodes | 358/22 |
| 4,680,630 | 7/1987 | Field | 358/22 |
| 4,743,961 | 5/1988 | Kobayashi | 358/40 |

FOREIGN PATENT DOCUMENTS 132123  10/1979  Japan .................................. 358/22

OTHER PUBLICATIONS

Fully Digitalized Color Picture in Picture Television System, by Masuda et al., IEEE Transactions on Consumer Electronics, vol. CE-25, Feb. 1979, pp. 152–159.
Digital Video Effects, by Inaba et al., NEC's Field Experience with Switching System, No. 56, Jan. 1980, pp. 130–134.
Television Gijutsu, Japanese Periodical, Dec. 1984, pp. 31–37.

Primary Examiner—Tommy P. Chin
Attorney, Agent, or Firm—Darby & Darby

[57] ABSTRACT

A video signal processing method for a picture-in-picture function comprises the steps of sampling a second composite color television signal corresponding to a subscreen by a signal (3 fsc) having a frequency three times the frequency of a chrominance subcarrier (fsc) signal to write the same in a field memory, reading the sampled signal written in the field memory at the frequency of 3 fsc in the ratio of one to N+1 data in the horizontal direction and at intervals of even horizontal lines in the vertical direction and switching the read compressed second composite color television signal and a first composite color television signal corresponding to a main screen in prescribed timing to display the same on a television screen. Color signals of the first and second composite color television signals may be previously made in phase with each other.

26 Claims, 5 Drawing Sheets

VIDEO SIGNAL PROCESSING METHOD AND APPARATUS THEREFOR FOR CREATING A PICTURE-IN-PICTURE

BACKGROUND OF THE INVENTION

1. Field of the Invention

The present invention relates to a video signal processing method and an apparatus therefor, and more specifically, it relates to a video signal processing method and an apparatus therefor for a picture-in-picture function of inserting a small screen in a part of a television screen.

2. Description of the Prior Art

Technique of inserting a plurality of small subscreens in a main screen of a television receiver is well known in the name of picture-in-picture function Such a picture-in-picture function is basically achieved by temporarily writing the contents of the subscreen in a field memory thereby to read the same in a position to be displayed along scanning of the main screen.

In general, the signal for the main screen is not synchronized with the signal for the subscreen, whereby correct color processing cannot be performed when the signal for the subscreen is directly written in the memory in the form of a composite color television signal (i.e., NTSC signal). In a conventional video signal processing method for the picture-in-picture function, therefore, the composite color television signal has been separated into a luminance signal and color difference signals to be respectively written in corresponding field memories, thereby to read the same synchronously with the main screen in a time-base compressed manner, for obtaining a video signal corresponding to the reduced subscreen. Such a video signal processing method is disclosed in, for example, "Television Gijutsu", Japanese Periodical, December 1984, pp. 31–37.

In such a conventional video signal processing method, however, the composite color television signal must be separated into a luminance signal Y and color difference signals R-Y and B-Y to be written in the corresponding field memories, whereby the circuit structure is complicated and large memory capacity is required.

SUMMARY OF THE INVENTION

Briefly stated, the present invention provides a video signal processing method which comprises the steps of supplying a composite video signal including chrominance subcarrier having a constant frequency, sampling the composite video signal at a frequency N/(N+1) times (N: natural number) the frequency of the chrominance subcarrier and reading the sampled composite video signal at a frequency N times the frequency of the chrominance subcarrier.

According to another aspect of the present invention, the video signal processing method includes the steps of supplying a first composite video signal corresponding to a main screen, supplying a second composite video signal corresponding to a subscreen to be inserted in a part of the main screen and including chrominance subcarrier having a constant frequency, sampling the second composite video signal at a frequency N (N: natural number) times the frequency of the chrominance subcarrier, writing the sampled second composite video signal in a field memory, reading the sampled second composite video signal written in the field memory at the frequency N times the frequency of the chrominance subcarrier in the ratio of one to N+1 data in the horizontal direction and at intervals of even horizontal scanning lines in the vertical direction and switching the first composite video signal and the second composite video signal read from the field memory in prescribed timing to display the same on the television screen.

According to still another aspect of the present invention, the step of writing in the field memory and the step of reading from the field memory simultaneously progress in a time-divisional manner.

According to a further aspect of the present invention, the video signal processing method includes the steps of supplying a signal at a frequency N times the frequency of the chrominance subcarrier, alternately switching writing and reading of the field memory synchronously with the signal of the frequency N times the chrominance subcarrier, addressing parts to be written with data in writing of the field memory and addressing parts from which the data are to be read in reading of the field memory.

According to a further aspect of the present invention, the video signal processing method further includes the step of previously making a first color signal included in the first composite video signal in phase with a second color signal included in the second composite video signal.

According to a further aspect of the present invention, the step of previously making the first and second color signals in phase includes the steps of detecting phase difference between burst signals of the first and second color signals and controlling the phase of at least one of the first and second color signals so that the burst signals of the first and second color signals are in phase with each other in response to the detected phase difference.

According to a further aspect of the present invention, a video signal processing apparatus comprises means for supplying a first composite video signal corresponding to a main screen, means for supplying a second composite video signal corresponding to a subscreen to be inserted in a part of the main screen and including chrominance subcarrier having a constant frequency, a field memory having horizontal and vertical addresses, means for sampling the second composite video signal at a frequency N (N: natural number) times the frequency of the chrominance subcarrier to supply the same to the field memory, means for controlling the field memory so that the sampled second composite video signal is written in the field memory, means for reading the sampled second composite video signal written in the field memory at the frequency N times the frequency of the chrominance subcarrier in the ratio of one to N+1 data in the horizontal direction and at intervals of even horizontal scanning lines in the vertical direction and means for switching the first composite video signal and the second composite video signal read from the field memory in prescribed timing to display the same on a television screen.

Accordingly, a principal object of the present invention is to provide a video signal processing method and an apparatus therefor which can write a composite color television signal directly in a field memory.

A second object of the present invention is to provide a video signal processing method and an apparatus therefor for a picture-in-picture function, which can obtain a compressed composite video signal corresponding to a subscreen with simple circuit structure and small memory capacity.

Still another object of the present invention is to provide a video signal processing method and an apparatus therefor which can prevent hue deviation of the subscreen in execution of the picture-in-picture function.

A principal advantage of the present invention is that the composite color television signal can be directly written in a field memory to be time-base compressed without any change in frequency and phase of the chrominance subcarrier signal.

Another advantage of the present invention is that the composite color television signal can be written in the field memory without being separated into a luminance signal and color difference signals, whereby the circuit structure can be simplified.

Still another advantage of the present invention is that the color signals for the main screen and the subscreen are previously made in phase with each other, whereby hue deviation of the subscreen can be prevented to reproduce the original hue.

These and other objects, features, aspects and advantages of the present invention will become more apparent from the following detailed description of the present invention when taken in conjunction with the accompanying drawings

DESCRIPTION OF THE PREFERRED EMBODIMENTS

Figure 1:
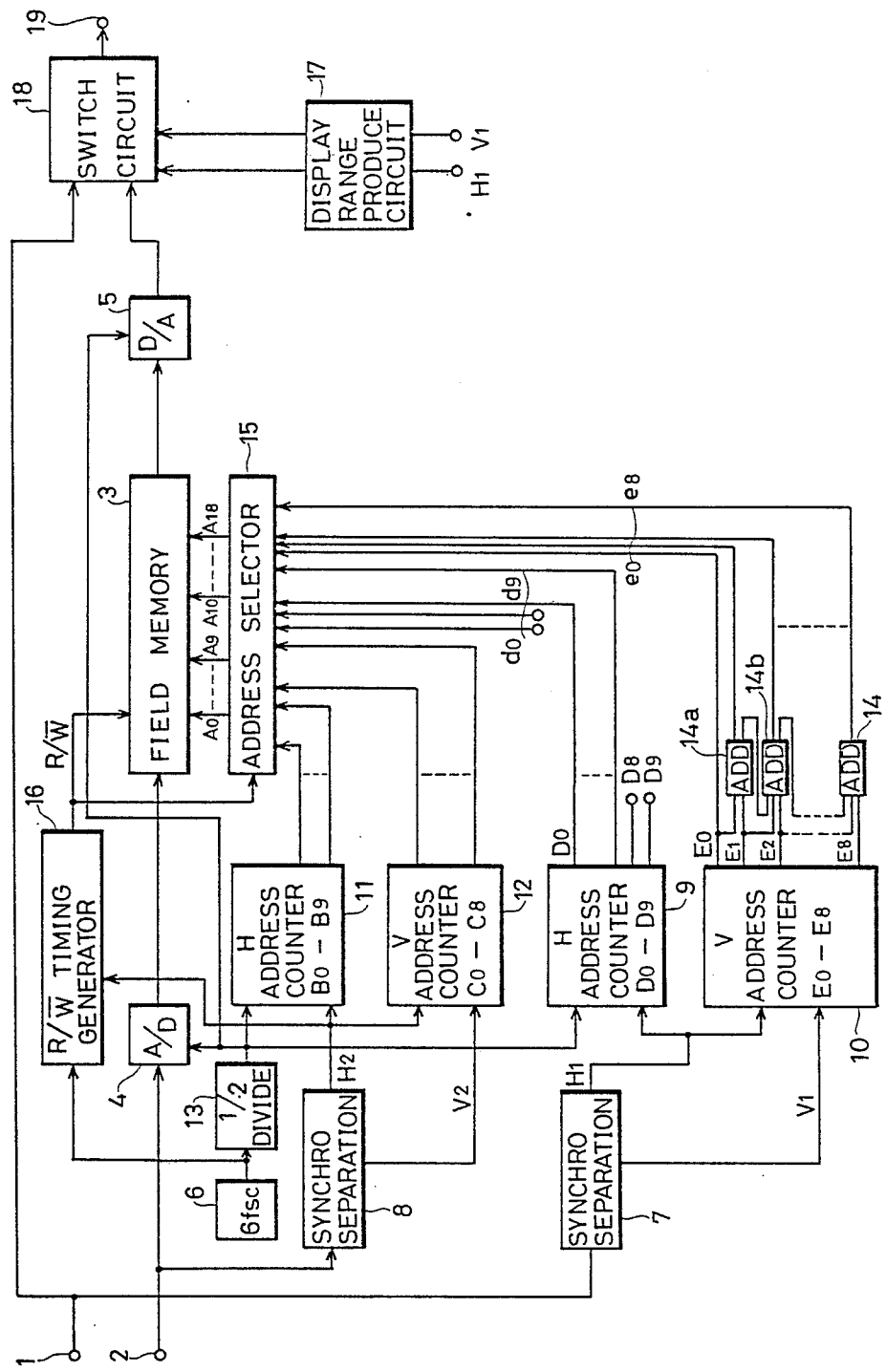
FIG. 1 is a block diagram showing a video signal processing apparatus according to an embodiment of the present invention.

FIG. 1 is a block diagram showing a video signal processing apparatus according to an embodiment of the present invention.

Description is now made on the structure of the video signal processing apparatus as shown in FIG. 1.

Referring to FIG. 1, an input terminal 1 receives a first composite color television signal (NTSC signal) corresponding to the main screen of a picture-in-picture mode and an input terminal 2 receives a second composite color television signal (NTSC signal) corresponding to a subscreen. The first and second color television signals are originally independent signals, which are not synchronized with each other. For example, the first and second color television signals may be independent tuner output signals respectively. When the present invention is applied to a video tape recorder (VTR), one of the color television signals may be a tuner output signal from the VTR and the other one may be a reproduced output signal of the VTR.

The first color television signal received in the input terminal 1 is supplied to a switching circuit 18 as well as to a first synchronizing separation circuit 7. The first synchronizing separation circuit 7 separates a horizontal synchronizing signal $H_1$ and a vertical synchronizing signal $V_1$ from the first color television signal to output the same.

The second color television signal received in the input terminal 2 is supplied to an A-D converter 4 as well as to a second synchronizing separation circuit 8. The second synchronizing separation circuit 8 separates a horizontal synchronizing signal $H_2$ and a vertical synchronizing signal $V_2$ from the second color television signal to output the same.

The second color television signal supplied from the input terminal 2 to the A-D converter 4 is sampled by a signal having a frequency three times the chrominance subcarrier or frequency subcarrier (fsc) signal of the color television signal by the A-D converter 4, to be supplied to a field memory 3. The signal (3fsc) having the frequency three times the fsc signal is obtained by dividing a signal (6fsc) having a frequency six times the fsc signal, which signal is outputted from an oscillator 6, by a ½ frequency divider 13. The output signal (6fsc) from the oscillator 6 may be synchronized with the fsc signal of an actual input color television signal.

The second color television signal thus sampled by the A-D converter 4 is written as a digital signal in the field memory 3. This field memory 3 may be commonly prepared by a still picture reproducing field memory of a VTR, and is formed by a number of dynamic RAMs, for example. The field memory 3 is mainly controlled by a read/write (R/$\overline{W}$) signal and address signals.

The R/$\overline{W}$ signal is produced by an R/$\overline{W}$ timing generator 16 on the basis of the 6fsc signal from the oscillator 6 and the horizontal synchronizing signal $H_2$ of the second color television signal. The field memory 3 is so controlled as to store the input digital signal in parts designated by the address signals when the R/$\overline{W}$ signal is at an "L" level, while outputting the data stored in the parts designated by the address signals when the R/$\overline{W}$ signal is at an "H" level.

The address signals for controlling reading/writing of the field memory 3 are formed by H addresses of 10 bits ($A_0$ to $A_9$) and V addresses of 9 bits ($A_{10}$ to $A_{18}$), which are produced in the following manner: In writing of the field memory 3, i.e., when the R/$\overline{W}$ signal is at an "L" level, a second H address counter 11 (10 bits) and a second V address counter 12 (9 bits) output address signals for designating written parts of the field memory 3. In further detail, the second H address counter 11 counts 3fsc signal obtained by dividing the 6fsc signal outputted from the oscillator 6 by the ½ frequency divider 13, and is reset by the horizontal synchronizing signal H2 from the second synchronizing separation circuit 8. The second V address counter 12 counts the horizontal synchronizing signal H2 from the second synchronizing separation circuit 8, and is reset by the vertical synchronizing signal $V_2$ from the second synchronizing separation circuit 8. Outputs ($B_0$ to $B_9$) from the second H address counter 11 and outputs ($C_0$ to $C_8$) from the second V address counter 12 are directly applied to the field memory 3 as the address signals ($A_0$ to $A_9$ and $A_{10}$ to $A_{18}$).

In reading of the field memory 3, i.e., when the R/$\overline{W}$ signal is at an "H" level, a first H address counter 9 (10 bits) and a first V address counter 10 (9 bits) output address signals for designating read parts of the field memory 3. In further detail, the first H address counter 9 counts the 3fsc signal outputted from the ½ frequency divider 13, and is reset by the horizontal synchronizing signal $H_1$ from the first synchronizing separation circuit 7. The first V address counter 10 counts the horizontal synchronizing signal $H_1$ from the first synchronizing separation circuit 7, and is reset by the vertical synchronizing signal $V_1$ from the first synchronizing separation circuit 7.

In order to read the data from the field memory 3, it is necessary to fetch the data at intervals with respect to both of horizontal and vertical directions for reducing the screen. Therefore, outputs $D_0$ to $D_7$ of the first H address counter 9 are connected to H addresses $A_2$ to $A_9$ of the field memory 3. Thus, the outputs from the first H address counter 9 are shifted by two bits to be applied as H addresses of the field memory 3, so that only H addresses of zero and multiples of four are designated and the data are read at intervals. As to outputs $E_0$ to $E_8$ from the first V address counter 10, $E_0$ is directly applied to a V address $A_{10}$ of the field memory 3 and $E_0+E_1$ outputted from an adder 14a is applied to a V address $A_{11}$ while that obtained by adding $E_1$ and $E_2$ to carry output of the adder 14a, that being outputted from an adder 14b, is applied to a V address $A_{12}$ and that obtained by adding $E_2$ and $E_3$ to carry output of the adder 14b is applied to a V address $A_{13}$, and so on. Thus, with respect to the vertical direction, only V addresses of zero and multiples of three are designated so that the data are read at intervals.

An address selector 15, which is controlled in response to the R/$\overline{\text{W}}$ signal from the R/$\overline{\text{W}}$ timing generator 6, is adapted to select either the pair of address counters 9 and 10 or 11 and 12 to apply the outputs thereof as address signals to the field memory 3.

The digital signal read from the field memory 3 in the aforementioned manner is converted into an analog signal by a D-A converter 5 which is controlled in response to the 3fsc signal from the ½ frequency divider 13, to be applied to one input of a switching circuit 18 as a compressed second color television signal corresponding to the subscreen of the picture-in-picture mode. As hereinabove described, the first color television signal corresponding to the main screen is directly applied to the other input of the switching circuit 18 from the input terminal 1. The switching circuit 18 is adapted to switch/select the first color television signal corresponding to the main screen and the compressed second color television signal corresponding to the subscreen in response to a display range signal applied from a display range producing circuit 17 formed by a monostable multivibrator for example, to output the same to an output terminal 19.

The display range signal is adapted to indicate the range of the subscreen displayed in the main screen, and is produced by the display range producing circuit 17 on the basis of the horizontal and vertical synchronizing signals $H_1$ and $V_1$ of the first color television signal corresponding to the main screen.

Figure 2:
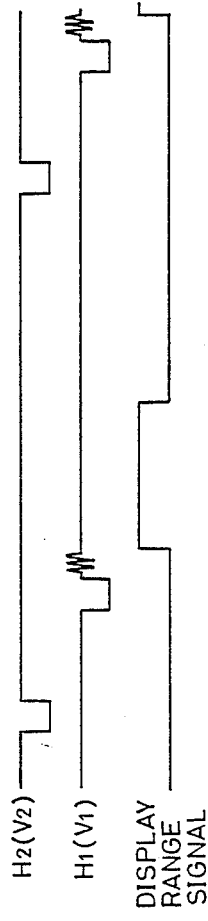
FIG. 2 is a timing chart showing a display range signal employed in the embodiment as shown in FIG. 1.

FIG. 2 is a timing chart showing the display range signal employed in the embodiment as shown in FIG. 1, which signal becomes an "H" level for a prescribed period from the horizontal synchronizing signal $H_1$ (and the vertical synchronizing signal $V_1$) of the first color television signal to indicate the display range. Upon receiving such display range signal, the switching circuit 18 selects the compressed second color television signal corresponding to the picture outputted from the D-A converter 5 in the "H" level period of the display range signal, i.e., in the display range for the subscreen thereby to output the same to the output terminal 19. In other case, the switching circuit 18 selects the first color television signal to output the same to the output terminal 19. Thus, according to this embodiment, the subscreen is inserted in an upper left part of the main screen. In addition, a burst signal is inserted immediately after each horizontal synchronizing signal $H_1$ as shown in FIG. 2.

Figure 3:
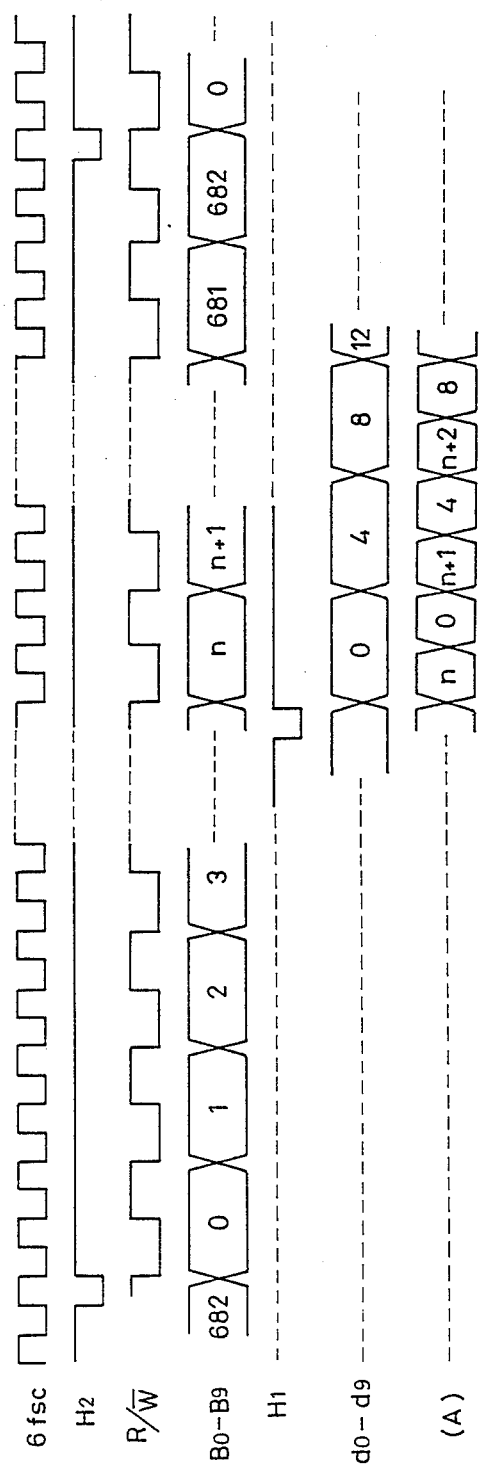
FIG. 3 is a timing chart for illustrating the operation of the video signal processing apparatus according to the embodiment as shown in FIG. 1.

FIG. 3 is a timing chart for illustrating the operation of the video signal processing apparatus according to the embodiment as shown in FIG. 1, and FIGS. 4A, 4B, 5A and 5B illustrate the principle of the present invention.

With reference to FIGS. 3 to 5B, description is now made on the operation of the embodiment as shown in FIG. 1.

First, it is assumed that the display range signal of FIG. 2 is at an "L" level, to indicate a period for displaying the main screen.

The second color television signal corresponding to the subscreen as received in the input terminal 2 is sampled by the 3fsc signal and A-D converted through the A-D converter 4, to be applied to the input of the field memory 3. As shown in FIG. 3, the R/$\overline{\text{W}}$ timing generator 16 generates the R signal repeating "H" and "L" levels in the cycle of the 3fsc signal in synchronization with the horizontal synchronizing signal $H_2$ of the second color television signal and the 3fsc signal, to apply the same to the field memory 3. Immediately after the second H address counter 11 is reset by the horizontal synchronizing signal $H_2$, the addresses thereof are incremented as 0, 1, . . . in the cycle of the 3fsc signal. Thus, the data output from the A-D converter 4 are stored in addresses of the field memory 3 designated by the outputs of the second H and V address counters 11 and 12 when the R/$\overline{\text{W}}$ signal is at an "L" level. In the case of FIG. 3, the data are stored in H addresses 0 to 682 with respect to a horizontal scanning line.

Then, it is assumed that the display range signal as shown in FIG. 2 becomes an "H" level to enter the display range for the subscreen. Namely, data reading from the field memory 3 is started in synchronization with the horizontal synchronizing signal $H_1$ (and the vertical synchronizing signal $V_1$) of the first color television signal. In further detail, the first H address counter 9 is reset by the horizontal synchronizing signal $H_1$ of the first color television signal, and thereafter only the H addresses of zero and multiples of four of the filed memory 3 are designated with respect to the horizontal direction so that the data are read at intervals in the "H" level timing of the R/$\overline{\text{W}}$ signal. Namely, as shown at FIG. 3(A), writing of the second color television signal in the field memory 3 and reading of the data at intervals from the field memory 3 simultaneously progress while being alternately switched by the R/$\overline{\text{W}}$ signal.

On the other hand, the first V address counter 10 is reset by the vertical synchronizing signal $V_1$ of the first color television signal and thereafter only the V addresses of zero and multiples of three of the field memory 3 are designated with respect to the vertical direction as hereinabove described, so that only horizontal scanning lines of multiples of three are extracted.

Figure 4B:
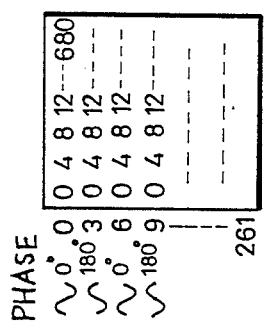
FIGS. 4A and 4B typically illustrate the principal of the present invention.
Figure 4A:
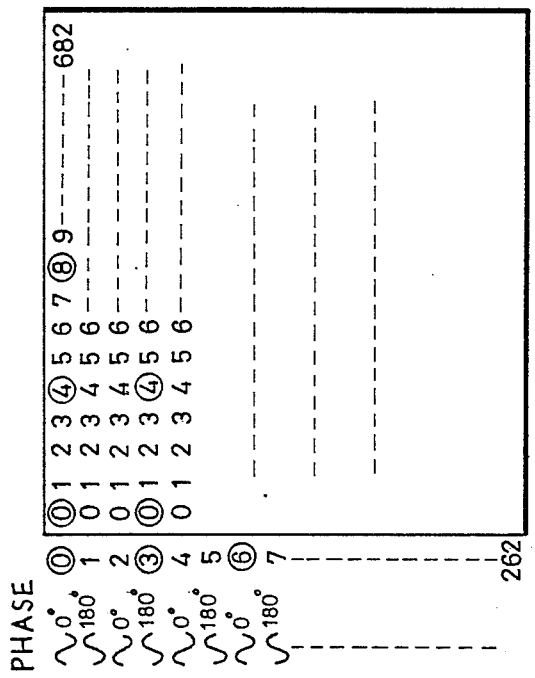

FIG. 4A typically shows a state in which the second color television signal for one field is stored in the field memory 3 and FIG. 4B typically shows the state of the compressed second color television signal extracted at intervals from the state of FIG. 4A in the aforementioned manner.

As shown in FIG. 4A, the video signal for one field of the second color television signal is stored in the field memory 3 as data of 683×263. From the state as shown in FIG. 4A, only data of the H addresses of multiples of four are extracted in the horizontal direction and only the horizontal scanning lines of multiples of three are extracted in the vertical direction as hereinabove described. Referring to FIG. 4A, the data of the addresses to be extracted are indicated in an encircled manner.

The data of such addresses are extracted in the cycle of the 3fsc signal, thereby to obtain a screen as shown in FIG. 4B as the compressed subscreen.

Figure 5B:
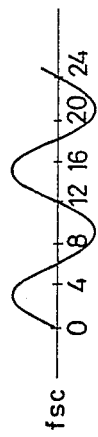
FIGS. 5A and 5B are waveform diagrams for illustrating the principal of the present invention.
Figure 5A:
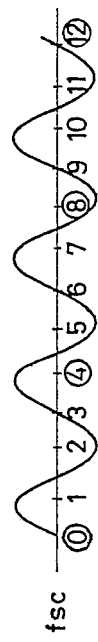

FIG. 5A is a waveform diagram showing the chrominance subcarrier signal of the second color television signal to be written in the field memory 3 and FIG. 5B is a waveform diagram showing the compressed chrominance subcarrier read from the field memory 3.

With reference to FIGS. 5A and 5B, consideration is made on the frequency and the phase of the chrominance subcarrier signal. When the chrominance subcarrier of FIG. 5A is so sampled that only the data (encircled ones) of the addresses of multiples of four are extracted in the cycle of 3fsc with respect to the horizontal direction in the aforementioned manner, derived is the chrominance subcarrier signal as shown in FIG. 5B. It is understood from FIGS. 5A and 5B that the chrominance subcarrier signal is not at all changed in frequency and phase.

In general description of the aforementioned sampling operation with respect to the chrominance subcarrier (fsc) signal, the fsc signal is sampled by a signal of a frequency N (natural number) times the frequency of the fsc signal, to be extracted in the ratio of one to N+1 data. In other words, obtained are data identical to those in the case of sampling the fsc signal at a frequency N/(N+1) times the fsc signal. The data are read at the frequency N times the fsc signal.

When, in general, a signal of a given frequency is sampled by a signal of a frequency approximate to the said frequency, obtained is difference frequency component. Namely, according to the present invention, the fsc signal is sampled at the frequency N/(N+1) times the frequency thereof, to obtain the data of frequency component 1/(N+1) times the fsc signal. The data read at the frequency N times the fsc signal are equivalent to those compressed to 1/(N+1) in time base, whereby a fsc signal identical in component to the original fsc signal is obtained. Namely, the second color television signal can be compressed with no change in frequency and phase of the fsc signal even if the same is directly written in the field memory 3 to be time-base compressed, whereby obtained is a video signal corresponding to the reduced screen. The data are extracted in the ratio of one to N+1 as hereinabove described, whereby the reduction ratio of the screen can be varied with the interval of the extracted data.

With respect to the vertical direction in FIG. 4A, the phase of the chrominance subcarrier signal is inverted between two vertically adjacent lines in the original color television signal. The aforementioned embodiment is so structured as to select only the lines of multiples of three, in order to retain the said relation. However, such selection is not restricted by the aforementioned embodiment, but the horizontal line may be essentially selected at intervals of even lines, in order to retain the said relation in the vertical direction.

Although the subscreen is located in the upper left part of the main screen according to the said embodiment, such a display position can be varied with the timing for reading the subscreen. Namely, the address counters 9 and 10 may be reset by pulse signals delayed by prescribed periods from the horizontal and vertical synchronizing signals. When the display position is changed, the display range signal must also be changed in timing.

When writing and reading of the field memory 3 are simultaneously performed in a time divisional manner as shown in the timing chart of FIG. 3, moving pictures are obtained in both of the main screen and the subscreen. On the other hand, when a video signal for one field of the subscreen is stored in the field memory 3 and the R/$\overline{W}$ signal is fixed at an "H" level to perform only reading while stopping writing, a still picture is displayed on the subscreen.

In relation with this, further, it is also possible to obtain the first and second color television signals from reproduced outputs of the same VTR to display only the main screen corresponding to the first color television signal in normal reproduction and to display the said one field of the first color television signal as a still picture on the subscreen while continuously displaying the main screen without stopping tape travelling in case of operating a still picture reproducing switch.

As hereinabove described, the first composite color television signal inputted in the input terminal 1 and the second composite color television signal inputted in the input terminal 2 are generally independent of each other, and hence color signals thereof are considered to be out of phase. When such composite color television signals having out-of-phase color signals are inputted in the circuit of the embodiment as shown in FIG. 1, hue deviation may be caused in the subscreen upon reproduction, whereby the original hue cannot be reproduced.

Figure 6:
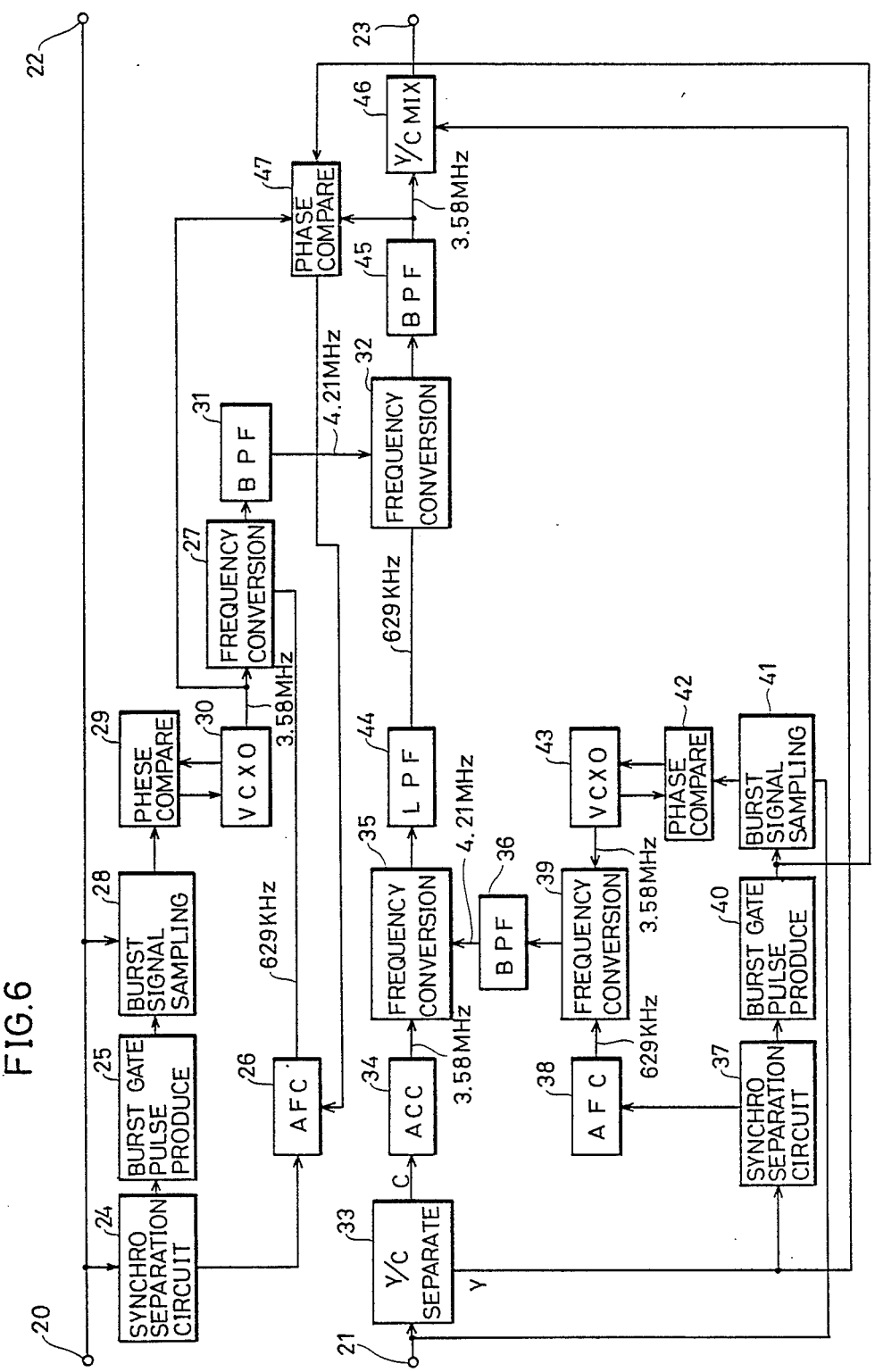
FIG. 6 is a block diagram showing another embodiment of the present invention.

FIG. 6 is a circuit diagram showing another embodiment of the present invention, which is adapted to solve the aforementioned problem of hue deviation by previously making the color signals of the first and second composite color television signals in phase with each other through frequency conversion technique. Referring to FIG. 6, an input terminal 20 receives a first composite color television signal (NTSC signal) corresponding to a main screen of the picture-in-picture mode and an input terminal 21 receives a second composite color television signal corresponding to a subscreen. The first and second color television signals are independent signals, which are not synchronized with each other. An output terminal 22 is connected to the input terminal 1 of FIG. 1 and an output terminal 23 is connected to the input terminal 2 of FIG. 1.

The principle of phasing of the color signals of the first and second color television signals is as follows: The color signal of the second composite color television signal is temporarily low-frequency converted to control the frequency of the carrier for returning the low-frequency converted color signal to the high frequency range in response to difference between the burst phase of the color signal in the main screen and the burst phase of the color signal in the subscreen, thereby to make the color signals of the main screen and the subscreen in phase with each other.

In further detail with reference to FIG. 6, a synchronizing separation circuit 24 separates a horizontal synchronizing signal from the first composite color television signal inputted in the input terminal 20. The horizontal synchronizing signal separated by the synchronizing separation circuit 24 is supplied to a burst gate pulse producing circuit 25 and an automatic frequency control (AFC) circuit 26. The AFC circuit 26 generates a signal of 629 KHz synchronous with the horizontal synchronizing signal of the first composite color television signal to supply the same to a frequency conversion circuit 27. On the other hand, a burst signal sampling circuit 28, which is controlled by the burst gate pulse producing circuit 25, extracts a burst signal from the color signal of the first composite color television signal, while a phase comparing circuit 29 and a voltage control crystal oscillator 30 produce a signal of 3.58 MHz synchronous with the burst signal to supply the same to the frequency conversion circuit 27. The frequency conversion circuit 27 multiplies the signal of 629 KHz, being synchronous with the horizontal synchronizing signal of the first composite color television signal, by the signal of 3.58 MHz being synchronous with the burst signal to output carrier of 4.21 MHz through a band-pass filter (BPF) 31 and supply the same to a frequency conversion circuit 32. The carrier of 4.21 MHz is employed as conversion carrier for returning a low-frequency converted color signal of the second composite color television signal to a high frequency range as hereinafter described.

Description is now made on low frequency conversion of the color signal of the second composite color television signal. Such low frequency conversion is required when the signal corresponding to the subscreen is an NTSC signal, while the same is unnecessary when the said signal is a reproduced signal of a VTR. First, a luminance/color signal separation circuit 33 separates the color signal from the second composite color television signal inputted in the input terminal 21, to supply the same to an automatic color signal control (ACC) circuit 34. The ACC circuit 34 maintain an amplitude of a color signal of 3.58 MHz, to supply the same to a frequency conversion circuit 35 for low frequency conversion. This low frequency conversion is performed by carrier of 4.21 MHz supplied from a BPF 36 to the frequency conversion circuit 35, which carrier of 4.21 MHz is produced in the following manner: A synchronizing separation circuit 37 and an AFC circuit 38 produce a signal of 629 KHz synchronous with the horizontal synchronizing signal of the second composite color television signal to supply the same to a frequency conversion circuit 39. On the other hand, a burst signal sampling circuit 41, which is controlled by a burst gate pulse producing circuit 40, extracts the burst signal of the second composite color television signal, while a phase comparing circuit 42 and a voltage control crystal oscillator 43 produce a signal of 3.58 MHz synchronous with the burst signal to supply the same to the frequency conversion circuit 39. The frequency conversion circuit 39 multiplies the signal of 629 KHz synchronous with the horizontal synchronizing signal of the second composite color television signal by the signal of 3.58 MHz synchronous with the burst signal, to supply a signal of 4.21 MHz to the frequency conversion circuit 35 as carrier for low frequency conversion through the BPF 36. The color signal for the subscreen thus low-frequency converted is supplied through a low-pass filter (LPF) 44 to the frequency conversion circuit 32 as a signal of 629 KHz.

The low-frequency converted color signal of 629 KHz for the subscreen is again returned to the high-frequency range in the frequency conversion circuit 32 by the carrier of 4.21 MHz supplied from the BPF 31. The color signal returned to the high-frequency range in the frequency conversion circuit 32 is supplied to a luminance/color signal mixing circuit 46 as a signal of 3.58 MHz through a BPF 45, to be then supplied to the output terminal 23 as the second composite color television signal.

The burst signal of the color signal of 3.58 MHz returned to the high-frequency range is compared in phase with continuous wave of 3.58 MHz synchronous with the burst signal of the first composite color television signal by a phase comparing circuit 47. An error signal obtained through the phase comparison is supplied to the AFC circuit 26, to control the phase (frequency) of a signal synchronous with the horizontal synchronizing signal of the first composite color television signal, which signal is outputted from the AFC circuit 26.

Namely, the frequency conversion circuit 27 produces the carrier of 4.21 MHz to make the burst signal of the subscreen returned to the high-frequency range in phase with the burst signal of the main screen, whereby the color signals of the main screen and the subscreen are made in phase. When the first and second composite color television signals having such in-phase color signals are supplied to the video signal processing apparatus as shown in FIG. 1, no hue deviation is caused in the subscreen upon reproduction.

Figure 7:
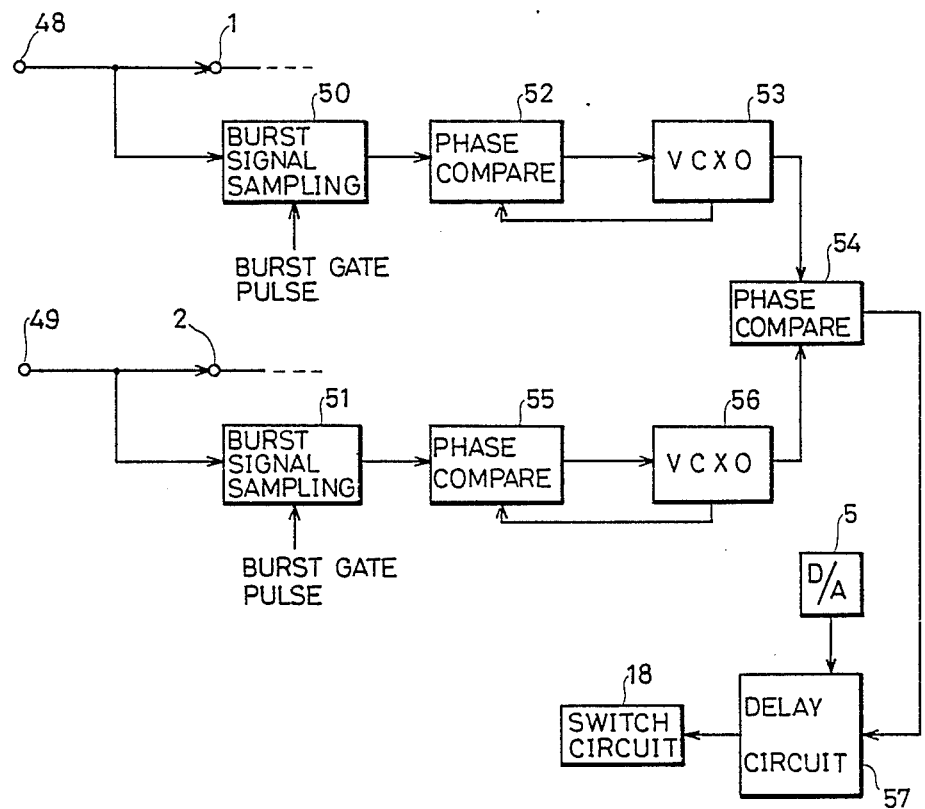
FIG. 7 is a block diagram showing still another embodiment of the present invention.

FIG. 7 is a block diagram showing still another embodiment of the present invention, which is also adapted to solve the aforementioned problem of hue deviation. Referring to FIG. 7, an input terminal 48 receives a first composite color television signal corresponding to the main screen, which is then supplied to the input terminal 1 of the video signal processing circuit of FIG. 1 as well as to a burst signal sampling circuit 50 which is controlled by burst gate pulses. On the other hand, an input terminal 49 receives a second composite color television signal corresponding to the subscreen, which is supplied to the input terminal 2 of the video signal processing circuit of FIG. 1, as well as to a burst signal sampling circuit 51 controlled by burst gate pulses. Alternatively, the input terminal 49 may receive the output signal from the D–A converter 5. The first and second composite color television signals are independent signals which are not synchronized with each other. A phase comparing circuit 52 and a voltage control crystal oscillator 53 produce a signal synchronous with the burst signal of the first composite color television signal, to supply the same to a phase comparing circuit 54. On the other hand, a phase comparing circuit 55 and a voltage control crystal oscillator 56 produce a signal synchronous with the burst signal of the second composite color television signal to supply the same to the phase comparing circuit 54. The output of the phase comparing circuit 54 is adapted to control a delay circuit 57 inserted between the D–A converter 5 and the switching circuit 18 in the video signal processing circuit as shown in FIG. 1. Namely, the output of the D–A converter 5 is delayed in response to the result of phase comparison of the burst signals of the first and second composite color television signals, thereby to compensate hue deviation of the subscreen resulting from the burst phase deviation.

Figure 8:
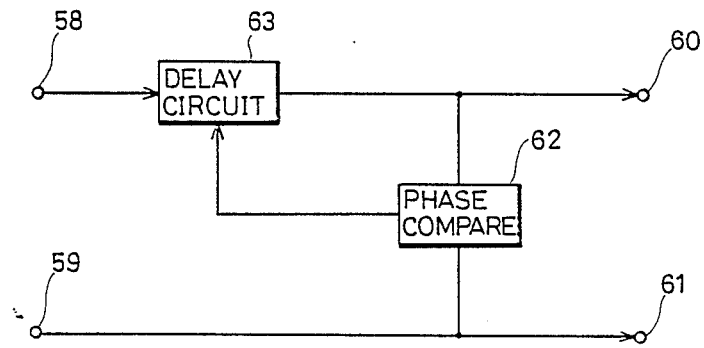
FIG. 8 is a block diagram showing a further embodiment of the present invention.

FIG. 8 is a block diagram showing still another embodiment of the present invention, which is also adapted to solve the problem of hue deviation of the subscreen. Referring to FIG. 8, an input terminal 58 receives a first composite color television signal corresponding to the main screen and an input terminal 59 receives a second composite color television signal corresponding to the subscreen. The first and second composite color television signals are independent signals, which are not synchronized with each other. An output terminal 60 is connected to the input terminal 1 of FIG. 1 and an output terminal 61 is connected to the input terminal 2 of FIG. 1. Burst signals of the first and second composite color television signals are compared with each other by a phase comparing circuit 62 (no circuit for sampling the burst signals is shown in the figure), while the output of the phase comparing circuit 62 controls a delay circuit 63 connected between the input terminal 58 and the output terminal 60. Namely, the delay circuit 63 is so controlled as to make the burst signals of the first and second composite color television signals in phase with each other in response to the result of phase comparison of the burst signals of the first and second composite color television signals. When the first and second composite color television signals having such in-phase color signals are supplied to the video signal processing circuit as shown in FIG. 1, no hue deviation is caused in the subscreen upon reproduction.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video signal process method comprising the steps of:
   supplying a composite video signal including chrominance subcarrier having a constant frequency;
   sampling said composite video signal at regular intervals and at a frequency N/(N+1) (N: natural number) times said frequency of chrominance subcarrier; and
   reading said sampled composite video signal at regular intervals and at a frequency N times said frequency of said chrominance subcarrier.

2. A video signal process method comprising the steps of:
   supplying a composite video signal including chrominance subcarrier having a constant frequency;
   sampling said composite video signal at regular intervals at a frequency N times said frequency of said chrominance subcarrier;
   writing said sampled composite video signal in a memory, and
   extracting said sampled composite video signal written in said memory at regular intervals in the ratio of one to N+1 data.

3. A video signal processing method comprising the steps of:
   supplying a first composite video signal corresponding to a main screen;
   supplying a second composite video signal corresponding to a subscreen to be inserted in a part of said main screen, said second composite video signal including chrominance subcarrier having a constant frequency;
   sampling said second composite video signal at a frequency N (N: natural number) times said frequency of said chrominance subcarrier;
   writing said sampled second composite video signal in a field memory;
   reading said sampled second composite video signal written in said field memory at a frequency N times said frequency of said chrominance subcarrier in the ratio of one to N+1 data in the horizontal direction and at intervals of even horizontal scanning lines in the vertical direction; and
   switching said first composite video signal and said second composite video signal read from said field memory in prescribed timing to output the same.

4. A video signal processing method in accordance with claim 3, wherein
   said step of writing in said field memory and said step of reading from said field memory simultaneously progress in a time-divisional manner.

5. A video signal processing method in accordance with claim 3, further including the steps of:
   supplying a signal of said frequency N times said frequency of said chrominance subcarrier,
   performing control of alternately switching reading and writing of said field memory in synchronization with said signal of said frequency N times said frequency of said chrominance subcarrier,
   addressing parts to be written with data in writing of said field memory, and,
   addressing parts from which data are to be read in reading of said field memory.

6. A video signal processing method in accordance with claim 5,
   further comprising the step of separating a horizontal synchronizing signal and a vertical synchronizing signal from said second composite video signal, wherein
   said step of addressing said parts to be written with data includes the steps of:
   counting said supplied signal of said frequency N times said frequency of said chrominance subcarrier and being reset by said horizontal synchronizing signal separated from said second composite video signal thereby to generate horizontal address signals,
   counting said horizontal synchronizing signal separated from said second composite video signal and being reset by said vertical synchronizing signal separated from said second composite video signal thereby to generate vertical address signals, and
   directly applying said horizontal address signals and said vertical address signals to said field memory in writing of said field memory.

7. A video signal processing method in accordance with claim 5,
   further comprising the step of separating a horizontal synchronizing signal and a vertical synchronizing signal from said first composite video signal, wherein
   said step of addressing said parts from which data are to be read includes the steps of:
   counting said supplied signal of said frequency N times said frequency of said chrominance subcarrier and being reset by said horizontal synchronizing signal separated from said first composite video signal thereby to generate horizontal address signals, shifting said horizontal address signals in reading of said field memory to apply the same to said field memory thereby to designate only one per N+1 addresses, counting said horizontal synchronizing signal separated from said first composite video signal and being reset by said vertical synchronizing signal separated from said first composite video signal thereby to generate vertical address signals, and producing address signals for selecting one horizontal scanning line at intervals of even horizontal scanning lines on the basis of said vertical address signals in reading of said field memory to apply the same to said field memory.

8. A video signal processing method in accordance with claim 3, wherein
said first and second composite video signals are independent of each other.

9. A video signal processing method in accordance with claim 8, wherein
one of said first and second composite video signals is a tuner output signal of a video tape recorder and the other is a reproduced output signal of said video tape recorder.

10. A video signal processing method in accordance with claim 3, further including the steps of:
stopping writing after writing of said second composite video signal for one field in said field memory, and
repeating only reading of said second composite video signal from said field memory.

11. A video signal processing method in accordance with claim 10, further including the step of writing said first composite video signal for one field in said field memory as said second composite video signal.

12. A video signal processing method in accordance with claim 3, further including the step of previously making a first color signal included in said first composite video signal in phase with a second color signal included in said second composite video signal.

13. A video signal processing method in accordance with claim 12, wherein
said step of previously making said first and second color signals in phase includes the steps of:
detecting phase difference between a burst signal of said first color signal and a burst signal of said second color signal, and
controlling the phase of at least one of said first and second color signals so that said burst signals of said first and second color signals are in phase with each other in response to said detected phase difference.

14. A video signal processing method in accordance with claim 13, wherein
said step of controlling the phase of said color signal includes the steps of:
low-frequency converting said second color signal,
producing a carrier signal for returning said low-frequency converted second color signal to a high-frequency range,
returning said low-frequency converted second color signal to a high-frequency range by said carrier signal, and
controlling the frequency of said carrier signal in response to said phase difference between said burst signals of said first and second color signals.

15. A video signal processing method in accordance with claim 14, wherein
said step of producing said carrier includes the steps of:
producing a signal of a first frequency synchronous with said burst signal of said first color signal,
producing a signal of a second frequency synchronous with said horizontal synchronizing signal of said first composite video signal, and
producing carrier of a third frequency by performing frequency conversion on the basis of said signal of said first frequency and said signal of said second frequency, and
said step of controlling said frequency of said carrier includes the step of controlling said second frequency in response to said phase difference between said burst signals of said first and second color signals.

16. A video signal processing apparatus comprising:
means for supplying a first composite video signal corresponding to a main screen;
means for supplying a second composite video signal corresponding to a subscreen to be inserted in a part of said main screen, said second composite video signal including chrominance subcarrier having a constant frequency;
a field memory having horizontal and vertical addresses;
means for sampling said second composite video signal at a frequency N (N: natural number) times said frequency of said chrominance subcarrier to supply the same to said field memory;
means for controlling said field memory so that said sampled second composite video signal is written in said field memory;
means for reading said sampled second composite video signal written in said field memory at a frequency N times said frequency of said chrominance subcarrier in the ratio of one to N+1 data in the horizontal direction and at intervals of even horizontal scanning lines in the vertical direction; and
means for switching said first composite video signal and said second composite video signal read from said field memory in prescribed timing to display the same on a television screen.

17. A video signal processing apparatus in accordance with claim 16, further comprising:
means for supplying a signal of said frequency N times said frequency of said chrominance subcarrier,
means for performing control of alternately switching writing and reading of said field memory in synchronization with said signal of said frequency N times said frequency of said chrominance subcarrier,
means for addressing parts of said field memory to be written with data, and
means for addressing parts of said field memory from which data are to be read.

18. A video signal processing apparatus in accordance with claim 17,
further including means for separating a horizontal synchronizing signal and a vertical synchronizing signal from said second composite video signal wherein
said means for addressing said parts to be written with data include:

a first address counter for counting said supplied signal of said frequency N times said frequency of said chrominance subcarrier and being reset by said horizontal synchronizing signal separated from said second composite video signal to generate said horizontal address signals, a second address counter for counting said horizontal synchronizing signal separated from said second composite video signal and being reset by said vertical synchronizing signal separated from said second composite video signal to generate said vertical address signals, and means for directly applying said horizontal address signals and said vertical address signals to said field memory in writing of said field memory.

19. A video signal processing apparatus in accordance with claim 17, further comprising means for separating a horizontal synchronizing signal and a vertical synchronizing signal from said first composite video signal, wherein said means for addressing said parts from which data are to be read includes:

a third address counter for counting said supplied signal of said frequency N times said frequency of said chrominance subcarrier and being reset by said horizontal synchronizing signal separated from said first composite video signal to generate said horizontal address signals, means for shifting said horizontal address signals to apply the same to said field memory in reading of said field memory thereby to designate only one per N+1 addresses, a fourth address counter for counting said horizontal synchronizing signal separated from said first composite video signal and being reset by said vertical synchronizing signal separated from said first composite video signal to generate said vertical addresses, and means for producing address signals for selecting one horizontal scanning line at intervals of even horizontal scanning lines on the basis of said vertical address signals to apply the same to said field memory in reading of said field memory.

20. A video signal processing apparatus in accordance with claim 16, wherein said first and second composite video signals are independent of each other.

21. A video signal processing apparatus in accordance with claim 20, wherein one of said first and second composite video signals is a tuner output signal of a video tape recorder and the other one is a reproduced output signal of said video tape recorder.

22. A video signal processing apparatus in accordance with claim 16, further comprising means for previously making a first color signal included in said first composite video signal in phase with a second color signal included in said second composite video signal.

23. A video signal processing apparats in accordance with claim 22, wherein said means for previously making said first and second color signals in phase includes:

means for detecting phase difference between a burst signal of said first color signal and a burst signal of said second color signal, and means for controlling the phase of at least one of said first and second color signals so that said burst signals of said first and second color signals are in phase with each other in response to said detected phase difference.

24. A video signal processing apparatus in accordance with claim 23, wherein said means for controlling the phase of said color signal includes:

means for low-frequency converting said second color signal, means for producing a carrier signal for returning said low-frequency converted second color signal to a high-frequency range, means for returning said low-frequency converted second color signal to a high frequency range by said carrier signal, and means for controlling the frequency of said carrier signal in response to said phase difference between said burst signals of said first and second color signals, said means for controlling the frequency of said carrier signal includes means for controlling said second frequency in response to said phase difference between said burst signals of said first and second color.

25. A video signal processing apparatus in accordance with claim 24, wherein said means for producing said carrier signal includes:

means for producing a signal of a first frequency synchronous with said burst signal of said first color signal, means for producing a signal of a second frequency synchronous with said horizontal synchronizing signal of said first composite video signal, and means for performing frequency conversion on the basis of said signal of said first frequency and said signal of said second frequency to produce a signal of a third frequency, said third frequency signal being said carrier signal, and wherein said means for controlling the frequency of said carrier signal includes means for controlling said second frequency in response to said phase difference between said burst signals of said first and second color signals.

26. A video signal processing method comprising the steps of:

supplying a composite video signal including chrominance subcarrier having a constant frequency;

sampling said composite video signal at regular intervals and at a frequency N (N: natural number) times said frequency of said chrominance subcarrier;

writing said sampled composite video signal in a field memory; and reading said sampled composite video signal written in said field memory at regular intervals and at a frequency N times said frequency of said chrominance subcarrier in the ratio of one to N+1 data in the horizontal direction and at intervals of even horizontal scanning lines in the vertical direction.

* * * * *